United States Patent
Kishida

(10) Patent No.: US 8,643,883 B2
(45) Date of Patent: Feb. 4, 2014

(54) IMAGE READING SYSTEM, IMAGE READING APPARATUS, CONTROL METHODS AND PROGRAMS THEREOF

(75) Inventor: Akira Kishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 13/256,445

(22) PCT Filed: Jul. 26, 2011

(86) PCT No.: PCT/JP2011/067574
§ 371 (c)(1),
(2), (4) Date: Sep. 14, 2011

(87) PCT Pub. No.: WO2012/023418
PCT Pub. Date: Feb. 23, 2012

(65) Prior Publication Data
US 2012/0127541 A1    May 24, 2012

(30) Foreign Application Priority Data
Aug. 18, 2010    (JP) .................................. 2010-183389

(51) Int. Cl.
*G06F 3/12* (2006.01)
*H04N 1/32* (2006.01)
*H04N 1/04* (2006.01)

(52) U.S. Cl.
USPC .......... 358/1.15; 358/474; 358/468; 358/486; 358/442; 358/444; 358/404; 358/1.13; 358/1.16

(58) Field of Classification Search
USPC ......... 358/474, 486, 468, 442, 434, 444, 404, 358/1.15, 1.13, 1.16
See application file for complete search history.

(56) References Cited

U.S. PATENT DOCUMENTS 5,999,213 A * 12/1999 Tsushima et al. .............. 348/180
6,721,465 B1 * 4/2004 Nakashima et al. .......... 382/318
(Continued)

FOREIGN PATENT DOCUMENTS

| JP | 2005-184748 A | 7/2005 |
| JP | 2006-238199 A | 9/2006 |
| JP | 2009-145970 A | 7/2009 |

OTHER PUBLICATIONS http://www.w3.org/TR/soap12-part1/, Soap Version 1.2 Part 1: Messaging Framework (Second Edition), W3C Recommendation Apr. 27, 2007.

(Continued)

*Primary Examiner* — Cheukfan Lee
(74) *Attorney, Agent, or Firm* — Fitzpatrick, Cella, Harper & Scinto

(57) ABSTRACT

The present invention provides an image reading system and an image reading apparatus with which an environment for performing a specific scan mode can be constructed with ease according to the functions of connected information processing apparatuses and the scan environment can be changed with ease, and control methods and programs thereof. To accomplish this, the image reading apparatus selects an information processing apparatus to which image data read from an original is to be transmitted, transmits identification information for identifying the image reading apparatus stored in advance in a memory and an instruction to construct an environment for performing the specific scan mode to the selected information processing apparatus, receives a response to the transmitted instruction, and, when the response is received, displays a setting screen in which settings regarding the environment for performing the specific scan mode can be changed on a display.

13 Claims, 11 Drawing Sheets

(56) References Cited

U.S. PATENT DOCUMENTS

| | | | |
|---|---|---|---|
| 6,867,881 B1* | 3/2005 | Umezato | 358/1.2 |
| 8,004,728 B2* | 8/2011 | Sugiura | 358/498 |
| 8,312,184 B2* | 11/2012 | Ito et al. | 710/36 |
| 2006/0195495 A1 | 8/2006 | Asano | |
| 2011/0058216 A1* | 3/2011 | Kishida et al. | 358/1.15 |
| 2011/0090543 A1* | 4/2011 | Hashiguchi et al. | 358/474 |
| 2011/0242558 A1* | 10/2011 | Usui | 358/1.9 |
| 2012/0257233 A1* | 10/2012 | Kishida | 358/1.13 |
| 2012/0307306 A1* | 12/2012 | Kishida | 358/1.15 |
| 2013/0094056 A1* | 4/2013 | Kobayashi | 358/1.15 |

OTHER PUBLICATIONS

WS-Eventing definition, from www.w3.org/Submission/WS-Eventing/.

* cited by examiner

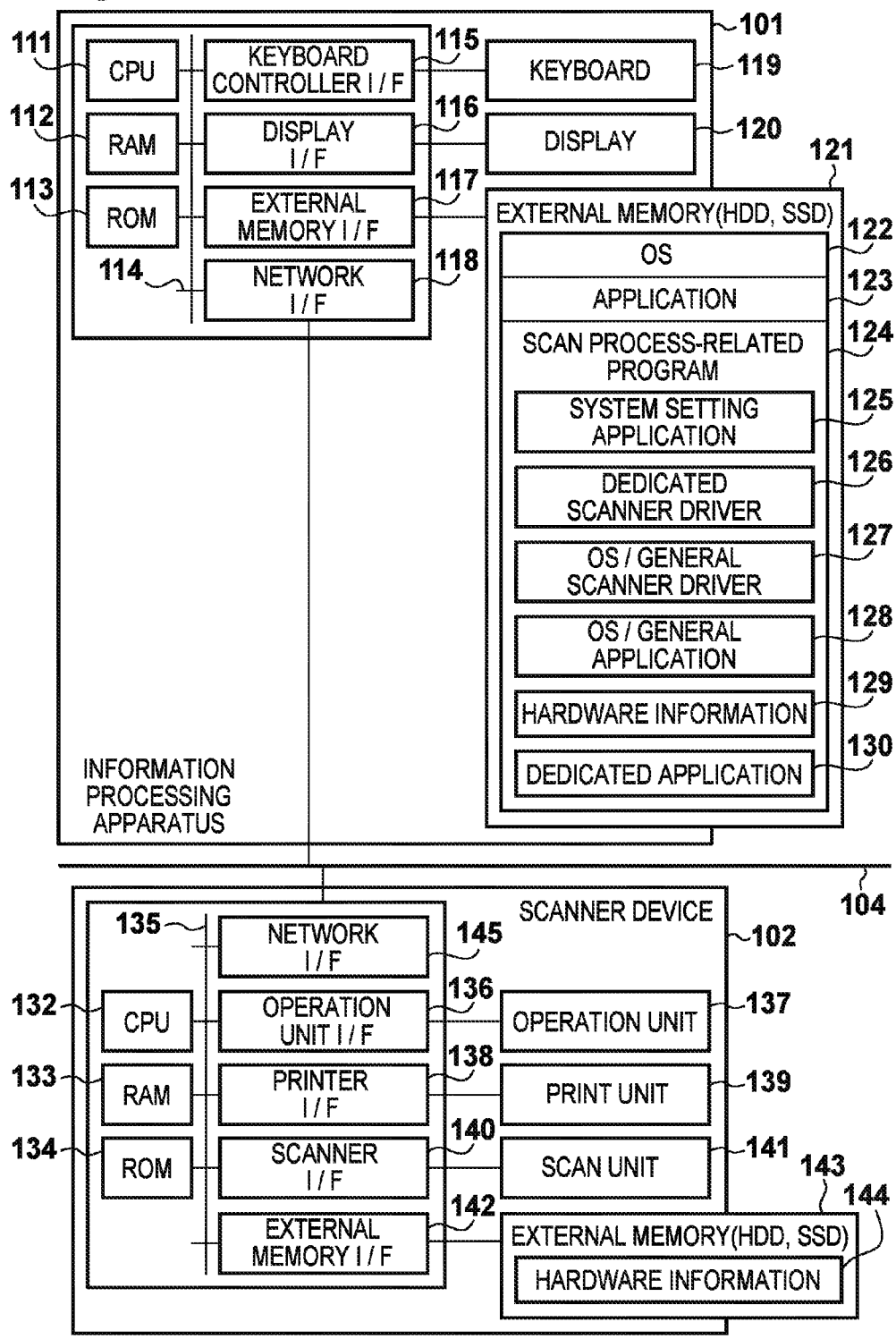

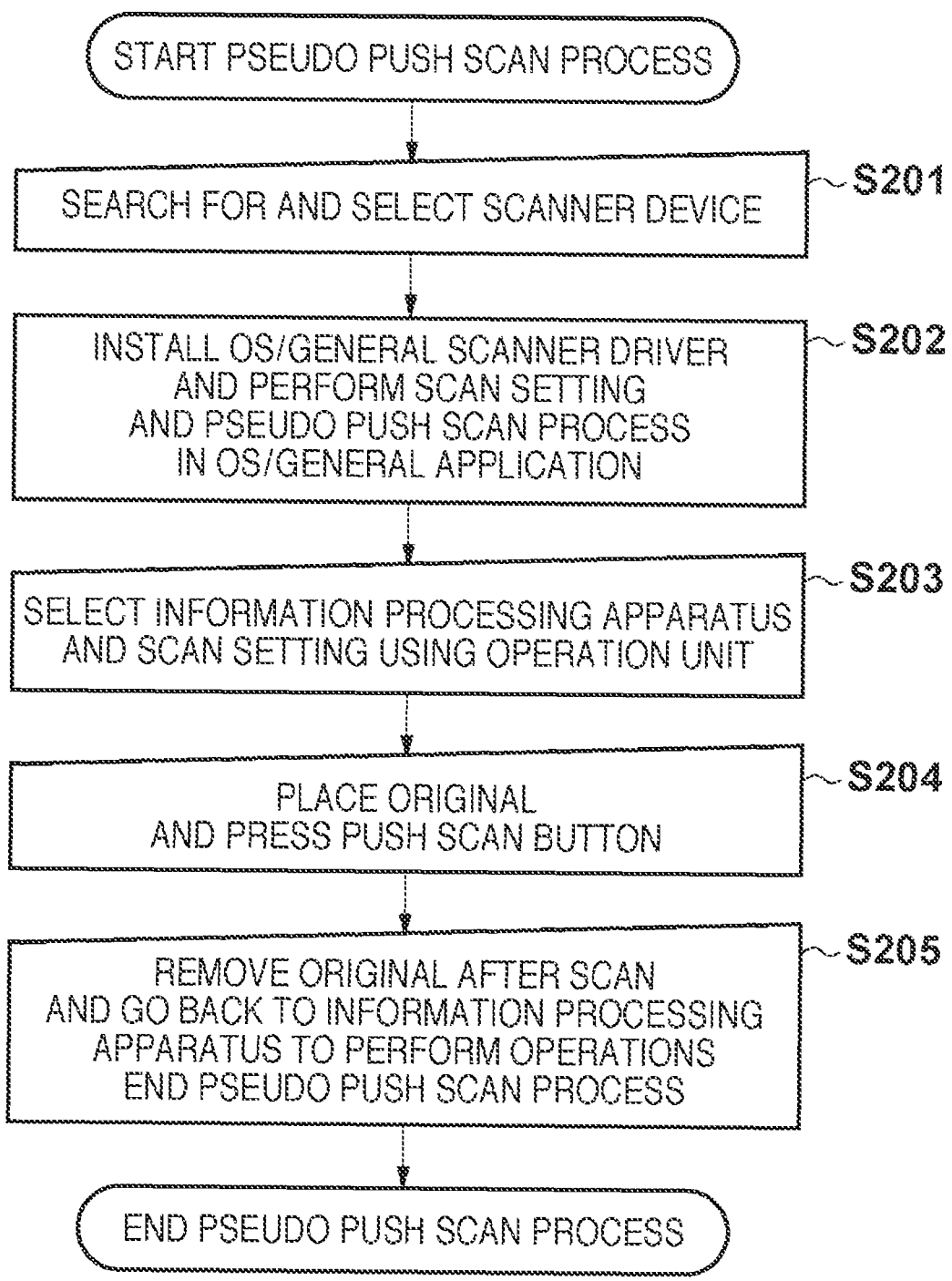

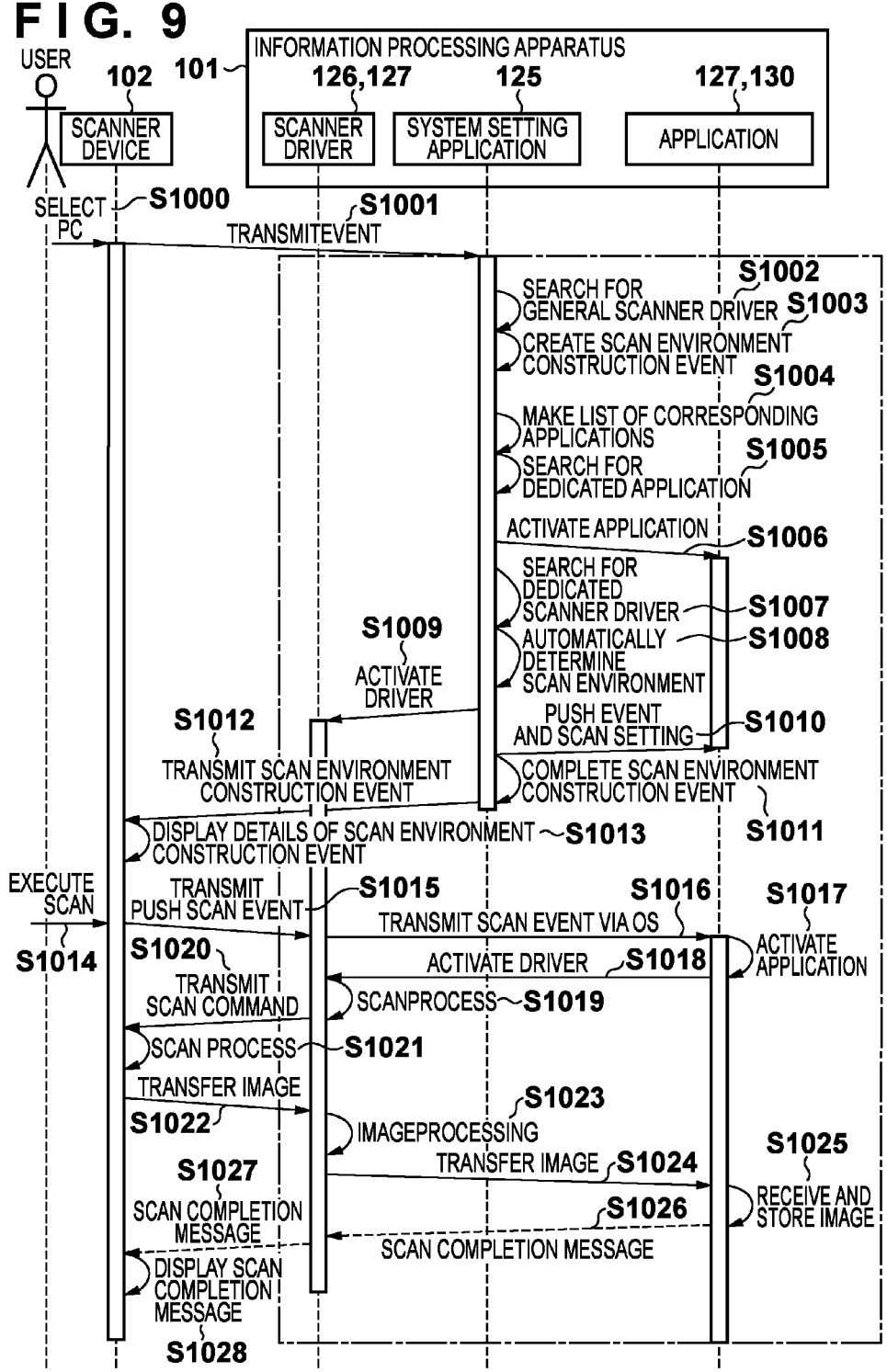

FIG. 10

| HARDWARE ID #1 | 1abc1ab1-111a-11a1-abc1-11111ab-1111a |
|---|---|
| HARDWARE ID #2 | 2abc2ab2-222a-22a2-abc2-22222ab-2222a |
| MAC ADDRESS | AA-BB-CC-DD-EE-01 |
| IP ADDRESS | aaa.bbb.ccc.123 |
| PROTOCOL #1 | Vendor Network Protocol |
| PROTOCOL #2 | Generic Network Protocol |
| PRIORITY | DEDICATED (OR GENERAL) |
| SCAN SETTING INFORMATION | 300 dpi, COLOR, AUTO IMAGE SIZE, AUTOROTATION ON, TILT CORRECTION ON··· |

FIG. 11

| PRIORITY | DEDICATED (OR GENERAL) |
|---|---|
| DEDICATED ENVIRONMENT | YES (OR NO) |
| DRIVER NAME | DEDICATED SCANNER DRIVER |
| DRIVER VERSION | 1.20 |
| DRIVER DATE | 2009/11/12 |
| REGISTERED APPLICATION | DEDICATED APPLICATION |
| DEDICATED SCAN SETTINGS | AUTOROTATION ON, TILT CORRECTION ON··· |
| GENERAL ENVIRONMENT | YES (OR NO) |
| DRIVER NAME | GENERAL SCANNER DRIVER |
| DRIVER VERSION | 1.10 |
| DRIVER DATE | 2009/7/1 |
| REGISTERED APPLICATION | GENERAL APPLICATION |
| COMMON SCAN SETTING INFORMATION | 300 dpi, COLOR, AUTO IMAGE SIZE |

IMAGE READING SYSTEM, IMAGE READING APPARATUS, CONTROL METHODS AND PROGRAMS THEREOF

TECHNICAL FIELD

The present invention relates to an image reading system, an image reading apparatus, control methods and programs thereof.

BACKGROUND ART

In order to use a peripheral device, such as a scanner device, which is an information reading apparatus, through an information processing apparatus, it is necessary to install a specific device driver for the peripheral device (a scanner driver, in the case where the peripheral device is a scanner device). Accordingly, if a plurality of scanner devices are used, it is necessary to install the same number of scanner drivers as there are scanner devices, and therefore for each scanner device, it is necessary for a user to perform a cumbersome installation operation by checking the IP address and finding a scanner driver for the scanner device.

In view of this, recently, research and development of an OS/general scanner driver that can be used in any scanner device regardless of the type of scanner device are being carried out. For example, a method has been proposed in which a scan process is performed by selecting an available network scanner device after a scan instruction has been issued from an application to the OS/general scanner driver. According to this method, it is possible to use all scanner devices supported by the OS/general scanner driver simply by preinstalling only the OS/general scanner driver in an information processing apparatus. Also, Japanese Patent Laid-Open No. 2009-145970 proposes a system in which when a management server receives a network participation message in unicast from a device, a driver for that device is push installed in each client PC, and thereby the usage environment is constructed and managed.

Furthermore, a system has been recently proposed in which a network-compliant scanner driver performs a pseudo push scan function as a specific scan mode that can be easily used in USB interface-compliant scanner devices. "Pseudo push scan" is the name of a scan operation that transmits image data from a scanner device to an information processing apparatus as if pushing the data to the information processing apparatus. The internal operations are as follows. In response to a user operation, an event signal for commencing the scan operation is transmitted from the scanner device to the information processing apparatus, and the information processing apparatus that has received the event signal acquires image data via the scanner driver. A pseudo push scan system can be constructed on a network by configuring the network interface-compliant scanner device and scanner driver to adapt to the internal operations of the pseudo push scan.

However, the conventional technology has the following problems. For example, the OS/general scanner driver as described above in the BACKGROUND ART generates and transmits commands in a format that can be processed by all of the corresponding scanner devices, and therefore has limited functions compared to a dedicated scanner driver specialized for a scanner device. Furthermore, these days, the pseudo push scan is increasingly performed in a mixed scan environment in which a plurality of scanner drivers, including a general scanner driver and a dedicated scanner driver, and applications are combined. This raises the possibility of the user experiencing confusion in deciding whether the general scanner driver or the dedicated scanner driver should be preferentially used when making a selection. Furthermore, in order to switch this setting, it is necessary to change the settings of the information processing apparatus in advance, and therefore the selection operation is an inefficient and laborious operation for the user.

SUMMARY OF INVENTION

The present invention enables the realization of an image reading system and an image reading apparatus with which an environment for performing a specific scan mode can be constructed with ease according to the functions of connected information processing apparatuses and the scan environment can be changed with ease, and enables the realization of control methods and programs thereof.

One aspect of the present invention provides an image reading system in which a plurality of information processing apparatuses and an image reading apparatus capable of executing a specific scan mode are connected, the image reading apparatus comprising: selection means for selecting an information processing apparatus to which image data read from an original is to be transmitted; transmission means for transmitting identification information for identifying the image reading apparatus stored in advance in a memory and an instruction to construct an environment for performing the specific scan mode to the information processing apparatus selected by the selection means; receiving means for receiving a response to the instruction transmitted by the transmission means; and display control means for, when the response is received by the receiving means, displaying a setting screen in which settings regarding the environment for performing the specific scan mode can be changed on a display, and each information processing apparatus comprising: construction means for, when the identification information and the instruction to construct the environment for performing the specific scan mode are received, constructing a scan environment dedicated to the image reading apparatus or a general scan environment usable in a plurality of image reading apparatuses as the environment for performing the specific scan mode used in the image reading apparatus; and notification means for notifying the image reading apparatus of a result of construction of the environment by the construction means.

Another aspect of the present invention provides an image reading apparatus capable of connecting to a plurality of information processing apparatuses and executing a specific scan mode, the image reading apparatus comprising: selection means for selecting an information processing apparatus to which image data read from an original is to be transmitted; transmission means for transmitting identification information for identifying the image reading apparatus stored in advance in a memory and an instruction to construct an environment for performing the specific scan mode to the information processing apparatus selected by the selection means; receiving means for receiving a response to the instruction transmitted by the transmission means; and display control means for, when the response is received by the receiving means, displaying a setting screen in which settings regarding the environment for performing the specific scan mode can be changed on a display.

Still another aspect of the present invention provides an image reading apparatus comprising: selection means for selecting an information processing apparatus to which image data read from an original is to be transmitted; acquisition means for acquiring, from the information processing apparatus, setting information regarding a read processing stored in the information processing apparatus selected by the selection means; modifying means for modifying the setting information acquired by the acquisition means in accordance with an instruction of an user; transmission means for transmitting the setting information modified by the modifying means to the information processing apparatus; instruction transmission means for transmitting a transmission instruction of a read start request to the information processing apparatus upon receiving a reading start instruction from the user; and control means for executing the read processing of an original based on the modified setting information, and transmitting generated image data to the information processing apparatus upon receiving a read start request transmitted from the information processing apparatus in response to the transmission instruction by the instruction transmission means.

Yet still another aspect of the present invention provides a method for controlling an image reading system in which a plurality of information processing apparatuses and an image reading apparatus capable of executing a specific scan mode are connected, the method comprising: with the image reading apparatus, selecting an information processing apparatus to which image data read from an original is to be transmitted; transmitting identification information for identifying the image reading apparatus stored in advance in a memory and an instruction to construct an environment for performing the specific scan mode to the selected information processing apparatus; receiving a response to the transmitted instruction; and when the response is received in the receiving step, displaying a setting screen in which settings regarding the environment for performing the specific scan mode can be changed on a display, and with each information processing apparatus, when the identification information and the instruction to construct the environment for performing the specific scan mode are received, constructing a scan environment dedicated to the image reading apparatus or a general scan environment usable in a plurality of image reading apparatuses as the environment for performing the specific scan mode used in the image reading apparatus; and notifying the image reading apparatus of a result of construction of the environment in the construction step.

Still yet another aspect of the present invention provides a method for controlling an image reading apparatus capable of connecting to a plurality of information processing apparatuses and executing a specific scan mode, the method comprising: selecting an information processing apparatus to which image data read from an original is to be transmitted; transmitting identification information for identifying the image reading apparatus stored in advance in a memory and an instruction to construct an environment for performing the specific scan mode to the selected information processing apparatus; receiving a response to the transmitted instruction; and when the response is received in the receiving step, displaying a setting screen in which settings regarding the environment for performing the specific scan mode can be changed on a display.

Yet still another aspect of the present invention provides a method for controlling an image reading apparatus, the method comprising: selecting an information processing apparatus to which image data read from an original is to be transmitted; acquiring, from the information processing apparatus, setting information regarding a read processing stored in the information processing apparatus selected in the selecting step; modifying the setting information acquired in the acquiring step in accordance with an instruction of an user; transmitting the setting information modified in the modifying step to the information processing apparatus; transmitting a transmission instruction of a read start request to the information processing apparatus upon receiving a reading start instruction from the user; and executing the read processing of an original based on the modified setting information, and transmitting generated image data to the information processing apparatus upon receiving a read start request transmitted from the information processing apparatus in response to the transmission instruction in the transmitting step.

Still yet another aspect of the present invention provides a computer-readable storage medium storing a computer program for causing a computer to execute the method for controlling the image reading system.

Yet still another aspect of the present invention provides a computer-readable storage medium storing a computer program for causing a computer to execute the method for controlling the image reading apparatus.

Further features of the present invention will become apparent from the following description of exemplary embodiments (with reference to the attached drawings).

BRIEF DESCRIPTION OF DRAWINGS

FIG. 1B is a block diagram showing examples of the configurations of an information processing apparatus and a scanner device according to the embodiment of the present invention.

FIG. 2 is a flowchart illustrating an example of a pseudo push scan process.

FIG. 9 is a sequence diagram of a scan operation according to the embodiment of the present invention.

FIG. 10 is a diagram showing an example of hardware information according to the embodiment of the present invention.

FIG. 11 is a diagram showing an example of scan environment construction information according to the embodiment of the present invention.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Reading System

An image reading system according to the present embodiment will be described first with reference to FIG. 1A. The configuration described below is merely an example and is not intended to limit the scope of the present invention. Simple Object Access Protocol (SOAP) and WS-Eventing, which will be mentioned below, are information that has been published at W3C (http://www.w3.org/) and (http://www.w3.org/Submission/WS-Eventing/), respectively, and thus descriptions thereof are omitted here.

Figure 1A:
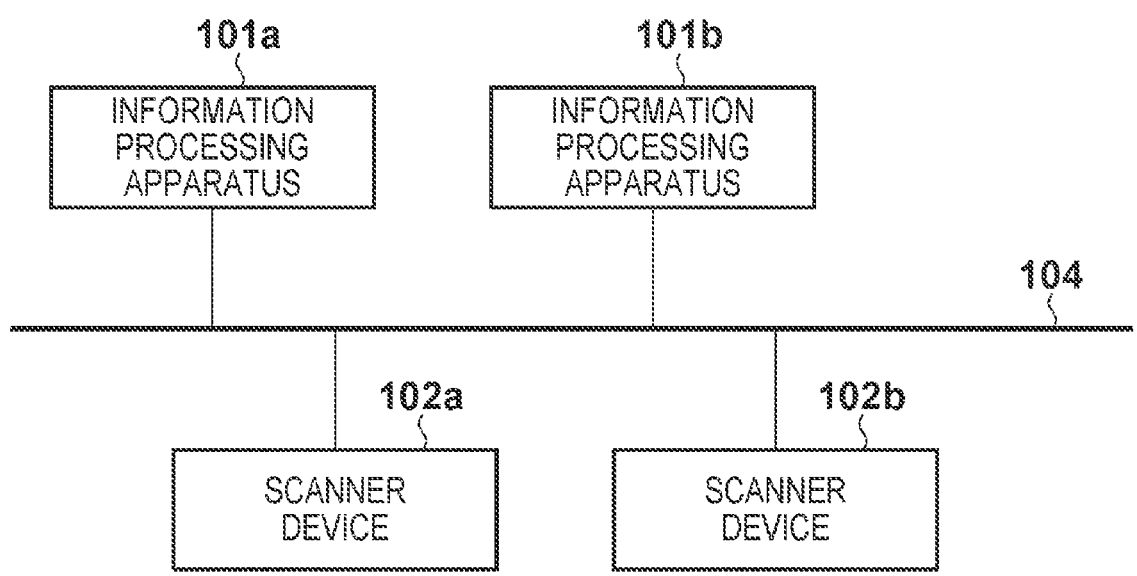
FIG. 1A is a diagram showing an example of the configuration of an image reading system according to an embodiment of the present invention.

As shown in FIG. 1A, an image reading system 100 includes a plurality of information processing apparatuses (personal computers, or PCs) 101a and 101b, and a plurality of scanner devices 102a and 102b, which are image reading apparatuses. These apparatuses are connected via a network (LAN) 104 implemented as Ethernet®. Hereinafter, the information processing apparatuses 101a and 101b will be referred to simply as an information processing apparatus 101, and the scanner devices 102a and 102b will be referred to as a scanner device 102, in cases where it is unnecessary to distinguish them from each other. The scanner device 102 reads an original, generates image data and transmits the image data to the information processing apparatus 101.

Example of Configuration of Each Apparatus

The configurations of the information processing apparatus 101 and the scanner device 102 will be described next with reference to FIG. 1B. In the information processing apparatus 101, a CPU 111 performs overall control of the devices connected to a system bus 114 in accordance with a program stored in a RAM 112. The RAM 112 also functions as the main memory, a working area and the like for the CPU 111. A ROM 113 stores various types of programs and data.

A keyboard controller I/F 115 controls key input from a keyboard 119 or a pointing device (not shown) such as a mouse. A display I/F 116 controls displays in a display 120. An external memory I/F 117 controls access to an external memory 121 such as a hard disk (HD) or a solid state disk (SSD). The external memory 121 functions as a computer-usable or readable storage medium storing an operating system program (hereinafter referred to as OS) 122, various types of applications 123, scan process-related programs 124, user files, an editing file and so on.

The scan process-related programs 124 include a system setting application 125, a dedicated scanner driver 126, an OS/general scanner driver 127, an OS/general application 128, hardware information 129, and a dedicated application 130, according to the present embodiment. There are cases where the scan process-related programs 124 are not initially stored in the external memory 121 of the information processing apparatus 101 when it is newly used by the user. In the present embodiment, the system setting application 125 that performs control to construct a scan system environment is stored in advance in each information processing apparatus 101, and the user makes settings such that the system setting application 125 is activated in the RAM 112. However, if the OS/general scanner driver 127 and the OS/general application 128 have not been preinstalled in the information processing apparatus 101 to which scan data is to be transmitted, they are assumed to not exist in the external memory 121.

The OS/general scanner driver 127 and the OS/general application 128 can use the functions commonly provided in corresponding device models. On the other hand, the dedicated scanner driver 126 is a scanner driver that only supports a single device model. The dedicated scanner driver 126 can maximize the utilization of the functions of the corresponding scanner device. The dedicated application 130 is an application optimized to perform operations in cooperation with the system setting application 125 and the dedicated scanner driver 126 and that is capable of executing pseudo push scans. If the dedicated scanner driver 126 and the dedicated application 130 have not been preinstalled in the information processing apparatus 101 to which scan data is to be transmitted by the user, they are assumed to not exist in the external memory 121.

The hardware information 129 is information sent from the scanner device 102, and the information received by the system setting application 125 from the scanner device 102 is temporarily stored in the external memory 121. A network I/F 118, which is connected to the scanner device 102 via the LAN 104, performs a process for controlling communication with the scanner device 102. In the present embodiment, since WS-Eventing is used for the event signals transmitted from the scanner device 102, the network I/F 118 implements a corresponding Web Service protocol.

An example of the configuration of the scanner device 102 will be described next. A CPU 132 performs overall control of the operations of the scanner device 102. A RAM 133 functions as the main memory, a working area, and the like for the CPU 132, and is also used as an area in which input information is expanded and as an environment data storage area. The RAM 133 also includes an NVRAM (non-volatile RAM) area, and the memory capacity can be expanded by an optional RAM connected to an add-on port (not shown). A ROM 134 stores various types of fonts, a control program and the like executed by the CPU 132, and various types of data.

A network I/F 145 transmits and receives data to and from the information processing apparatus 101. A printer I/F 138 controls an interface with a print unit 139, which is a printer engine. A scanner I/F 140 controls an interface with a scan unit 141, which is a scanner engine.

Access to an external memory 143 is controlled by an external memory I/F 142. The external memory 143 includes a hard disk (HD), a solid state disk (SSD) or the like, which is connected as an option, and may store hardware information 144 of the image reading system 100. If the external memory 143 such as a hard disk is not connected, information and the like used by the information processing apparatus 101 is stored in the ROM 134.

An operation unit I/F 136 controls an interface with an operation unit 137 that performs scan process setting for the scanner device 102. The operation unit 137 is equipped with an operation panel that receives user operations, and the operation panel includes a switch for operation, an LED display device and the like. It is also possible to provide an NVRAM (not shown), in which scan setting information from the operation panel may be stored.

The CPU 132 acquires image data from the scan unit 141 via the scanner I/F 140 based on the control program or the like stored in the ROM 134. Also, the CPU 132 is capable of performing processing for communication with the information processing apparatus 101 via the network I/F 145, and therefore the CPU 132 can transmit the image data to the information processing apparatus 101 as well as notifying the information processing apparatus 101 of the information or the like stored in the scanner device 102. In the present embodiment, since WS-Eventing is used for the event signals transmitted from the scanner device 102, the network I/F 145 implements a corresponding Web Service protocol.

Pseudo Push Scan Process (Comparative Example)

A pseudo push scan process of the OS/general scanner driver 127 performed by the OS 122 of the information processing apparatus 101 according to a comparative example will be described next with reference to FIG. 2. The pseudo push scan process is an example of a specific scan mode according to the present embodiment. When the user selects a scanner device 102 as the scanner device he/she wants to use through the information processing apparatus 101, an OS/general scanner driver 127 is installed from an internal memory of the OS 122, the external memory 121, or another storage apparatus. The installed OS/general scanner driver 127 is activated by an application 123 and operated in the RAM 112 to perform the pseudo push scan process. Overall control of the processing described below is performed by the CPU 111. In FIG. 2, the steps including a user operation are shown in trapezoids.

When the pseudo push scan process is commenced, in S201, the CPU 111 receives a user operation, and searches for and selects a scanner device 102 that is to be used. When a scanner device 102 has been selected, in S202, the CPU 111 installs the OS/general scanner driver 127 in the OS 122 from the internal memory, the external memory 121 or another storage apparatus. Furthermore, in S202, following the installation of the OS/general scanner driver 127, the CPU 111 also performs scan process setting and pseudo push scan process setting in the OS/general application 128.

Next, in S203, the user goes to the scanner device 102 carrying an original, and selects, using the operation unit 137, an information processing apparatus 101 to which scan data is to be transmitted. Here, upon receiving the information selected by a user operation, the CPU 111 may update the scan settings if necessary. Then, in S204, the user places the original on the scan unit 141 of the scanner device 102 and issues an instruction to commence a pseudo push scan.

After scanning, in S205, the user removes the original from the scanner device 102, and goes back to the information processing apparatus 101 to perform operations such as image processing using the image data captured in the OS/general application 128. When the user has finished working on the OS/general application 128, the CPU 111 ends the pseudo push scan process.

On the other hand, the pseudo push scan operation of the dedicated scanner driver 126 shown in FIG. 1B is basically the same as that of the OS/general scanner driver shown in FIG. 2, and thus its flowchart is not shown. In this case, the dedicated scanner driver 126 and the installation program of the dedicated application 130 perform substantially the same processing as that performed by the OS 122.

The pseudo push scan operations via a network have been described above, but a mixed environment, in which both the pseudo push scan operation of the OS/general scanner driver and that of the dedicated scanner driver are present in an information processing apparatus 101, is conceivable as well. In this case, a problem may arise in that the user experiences confusion in deciding which scanner driver to use. Furthermore, the pseudo push scan environment may vary from information processing apparatus 101 to information processing apparatus 101 depending on the user settings. In this case as well, the user needs to go to the information processing apparatus 101 to which scan data is to be transmitted and set the scan environment. According to the present embodiment, even in such a situation, it is possible to select an environment in which the pseudo push scan operation can be performed using the scanner device 102.

Pseudo Push Scan Process (Present Embodiment)

Figure 3:
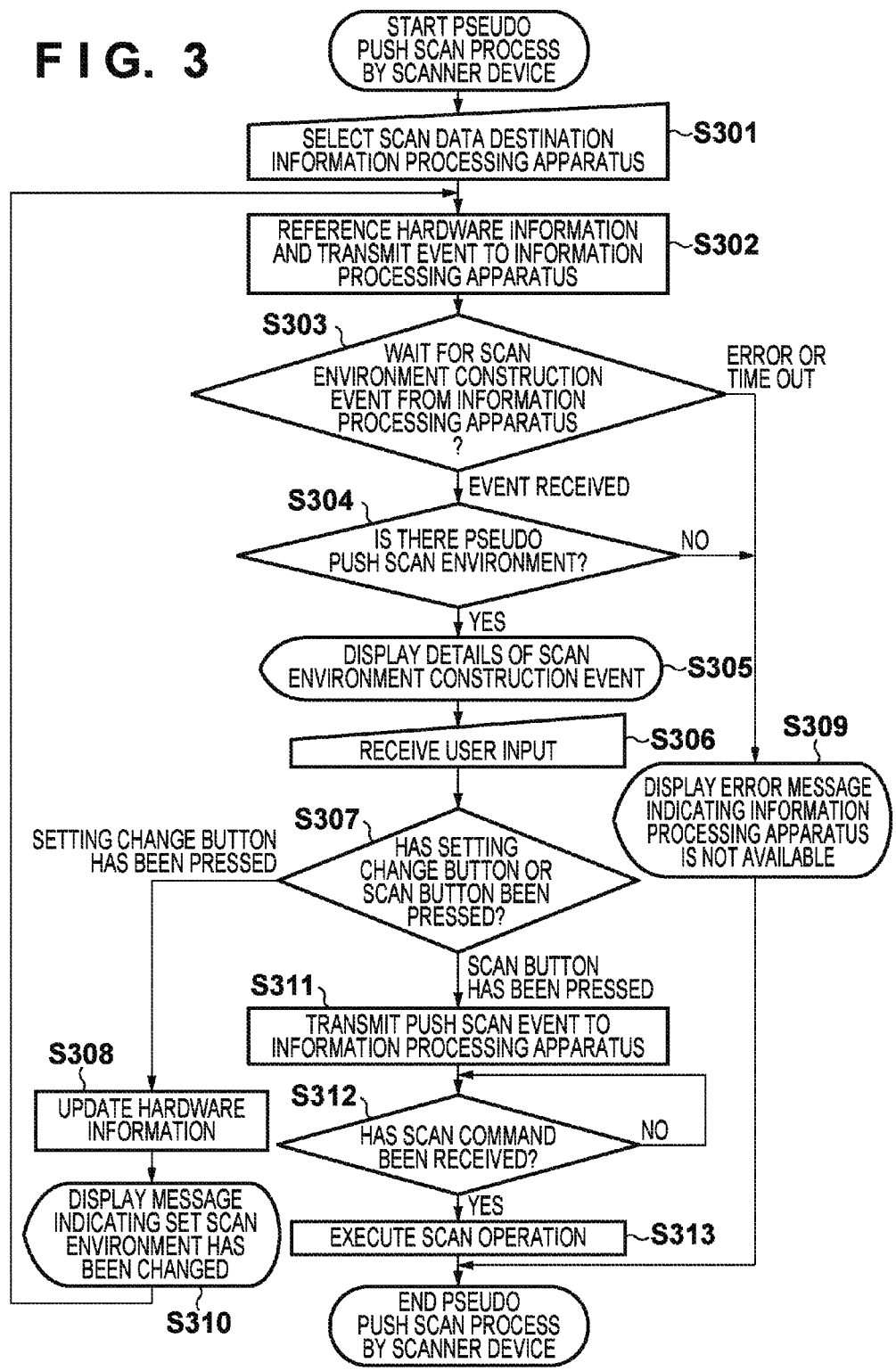
FIG. 3 is a flowchart illustrating an example of a pseudo push scan process performed by the scanner device according to the embodiment of the present invention.

A pseudo push scan process specific to the present embodiment performed by the scanner device 102 will be described next with reference to FIG. 3. Overall control of the processing described below is performed by the CPU 132 of the scanner device 102. In FIG. 3, the steps including a user operation are shown in trapezoids.

When the pseudo push scan process by the scanner device 102 is commenced, in S301, the CPU 132 first receives a user operation via the operation unit 137, and selects an information processing apparatus 101 to which scan data is to be transmitted. Then, in S302, the CPU 132 transmits, to the selected information processing apparatus, a push mode event (first event) according to WS-Eventing that has referenced the hardware information 144 as parameters. The push mode event is an event that instructs the information processing apparatus 101 to construct a pseudo push scan environment. By transmitting the push mode event, the scanner device 102 can acquire pseudo push scan environment information of the information processing apparatus 101. The hardware information will be described later in detail with reference to FIG. 10. After that, in S303, the CPU 132 waits, for a predetermined period of time, for a scan environment construction event (second event) that is a response to the push mode event and that indicates the processing result of the push mode event to be received from the information processing apparatus 101 to which the push mode event was transmitted. The scan environment construction event will be described later in detail with reference to FIG. 11.

If the scan environment construction event is not received within the predetermined period of time or an error is received from the information processing apparatus 101, the processing advances to S309, where the CPU 132 displays an error message indicating that the information processing apparatus is not available, or the like, on the operation unit 137, and the processing ends. If, on the other hand, the scan environment construction event is received, the processing advances to S304, where the CPU 132 determines based on the content of the event whether or not there is a pseudo push scan environment. If there is no pseudo push scan environment, the processing advances to S309, where the CPU 132 displays an error message indicating that the information processing apparatus is not available, or the like, on the operation unit 137, and the processing ends.

If, on the other hand, it is determined in S304 that there is a pseudo push scan environment, the processing advances to S305, where the CPU 132 displays the details of the scan environment construction event on the operation unit 137, and also displays the details of the settings regarding the pseudo push scan environment so as to be capable of being changed. The display and operation of a user interface performed in S305 will be described later with reference to FIG. 6. After that, the CPU 132 receives a user input via the operation unit 137 in S306 and determines which of a setting change button and a scan button has been pressed in S307. If it is determined that the setting change button has been pressed, the CPU 132 updates the hardware information 144 in S308 and displays a message indicating that the settings of the pseudo push scan system have been changed on the operation unit 137 in S310, and the processing returns to S302. The display and operation of a user interface on the operation unit 137 performed in S310 will be described later with reference FIG. 7.

If, on the other hand, the scan button has been pressed using the operation unit 137, in S311, the CPU 132 transmits a push scan event to the information processing apparatus 101. In the present embodiment, there are two types of push scan events that are transmitted by the scanner device 102: a push scan event for the dedicated application and a push scan event for the general application. If a value of the priority column of the scan environment construction event indicates "dedicated", the scanner device 102 transmits a push scan event for the dedicated application to the information processing apparatus 101. If the value indicates "general", a push scan event for the general application is transmitted to the information processing apparatus 101. After that, in S312, the CPU 132 waits for a scan command to be transmitted from the information processing apparatus 101. When the CPU 132 receives the scan command, the processing advances to S313, where a scan operation is executed with the scan unit 141, and the processing ends.

Acquirement of Pseudo Push Scan Environment Information by Information Processing Apparatus A process for acquiring pseudo push scan environment information performed by the system setting application 125 that is activated on the OS 122 of the information processing apparatus 101 to which scan data is to be transmitted will be described next with reference to FIG. 4. Overall control of the processing described below is performed by the CPU 111 of the information processing apparatus 101. The processing described below is commenced by the system setting application 125 receiving the event that has referenced the hardware information and was transmitted in S302.

First, in S401, the system setting application 125 loads the received hardware information 129 into the RAM 112. Then, in S402 to S404, the system setting application 125 makes a query to the OS 122, and acquires the IP addresses of ports associated with the general scanner driver from among all of the registered ports.

Next, in S405, the system setting application 125 determines whether or not there is a port having an IP address that matches that of the scanner device 102. If it is determined that there is a usable (matching) port, the processing advances to S406. If it is determined that there is no such a port, the processing advances to S407. Then, in S406, the system setting application 125 sets "yes" in the general environment column of the scan environment construction event, which was newly created in the RAM 112, and the processing advances to S408. The scan environment construction event will be described later in detail with reference to FIG. 11. On the other hand, in S407, the system setting application 125 sets "no" in the general environment column of the scan environment construction event, which was newly created in the RAM 112, and the processing advances to S414.

In S408, the system setting application 125 makes a list of applications capable of push scan that have been installed. Then, in S409, the system setting application 125 determines, based on the result obtained in S408, whether or not a dedicated application has been installed. If the dedicated application has not been installed, the processing advances to S413. If the dedicated application has been installed, the processing advances to S410.

In S410, the system setting application 125 searches for a dedicated scanner driver file and a setting file and checks the settings. Then, in S411, the system setting application 125 determines whether or not a dedicated scanner driver corresponding to the hardware ID has been installed. If the dedicated scanner driver has not been installed, the processing advances to S413. If the dedicated scanner driver has been installed, the processing advances to S412. In S412, the system setting application 125 sets "yes" in the dedicated environment column of the scan environment construction event loaded into the RAM 112, and the processing advances to S414.

On the other hand, in S413, the system setting application 125 sets "no" in the dedicated environment column of the scan environment construction event loaded into the RAM 112, and the processing advances to S414. After the processing of S407, S412 or S413, the processing advances to S414, where the system setting application 125 performs a process for automatically setting a general or dedicated scan environment. The process for automatically setting a general or dedicated scan environment will be described later with reference to FIG. 5. In S414, when a general or dedicated scan environment has been set (constructed), the processing advances to S415, where the system setting application 125 transmits the scan environment construction event to the scanner device 102, and the processing ends. In this manner, the system setting application 125 notifies the scanner device 102 of the finished scan environment construction event obtained in S414 as pseudo push scan environment information of the information processing apparatus 101. This enables a scan operation optimal for the user in the scanner device 102.

Process for Automatically Setting General or Dedicated Scan Environment

The process for automatically setting a general or dedicated scan environment specific to the present embodiment performed by the system setting application 125 will be described next with reference to FIG. 5. Overall control of the processing described below is performed by the CPU 111. The following will describe details of the process of S414 mentioned above and executed using the search result of the pseudo push scan environment in S401 to S414 shown in FIG. 4 and the hardware information.

First, in S501, the system setting application 125 loads the scan environment construction event currently being created into the RAM 112. Then, in S502, the system setting application 125 refers to the dedicated environment column of the scan environment construction event, and determines whether or not there is an environment in which the dedicated application 130 and the dedicated scanner driver 126 have been installed. If the value indicating "yes" has been set in the dedicated environment column, which means there is such an environment, the processing advances to S503. If there is no such environment, the processing advances to S505.

Figure 4:
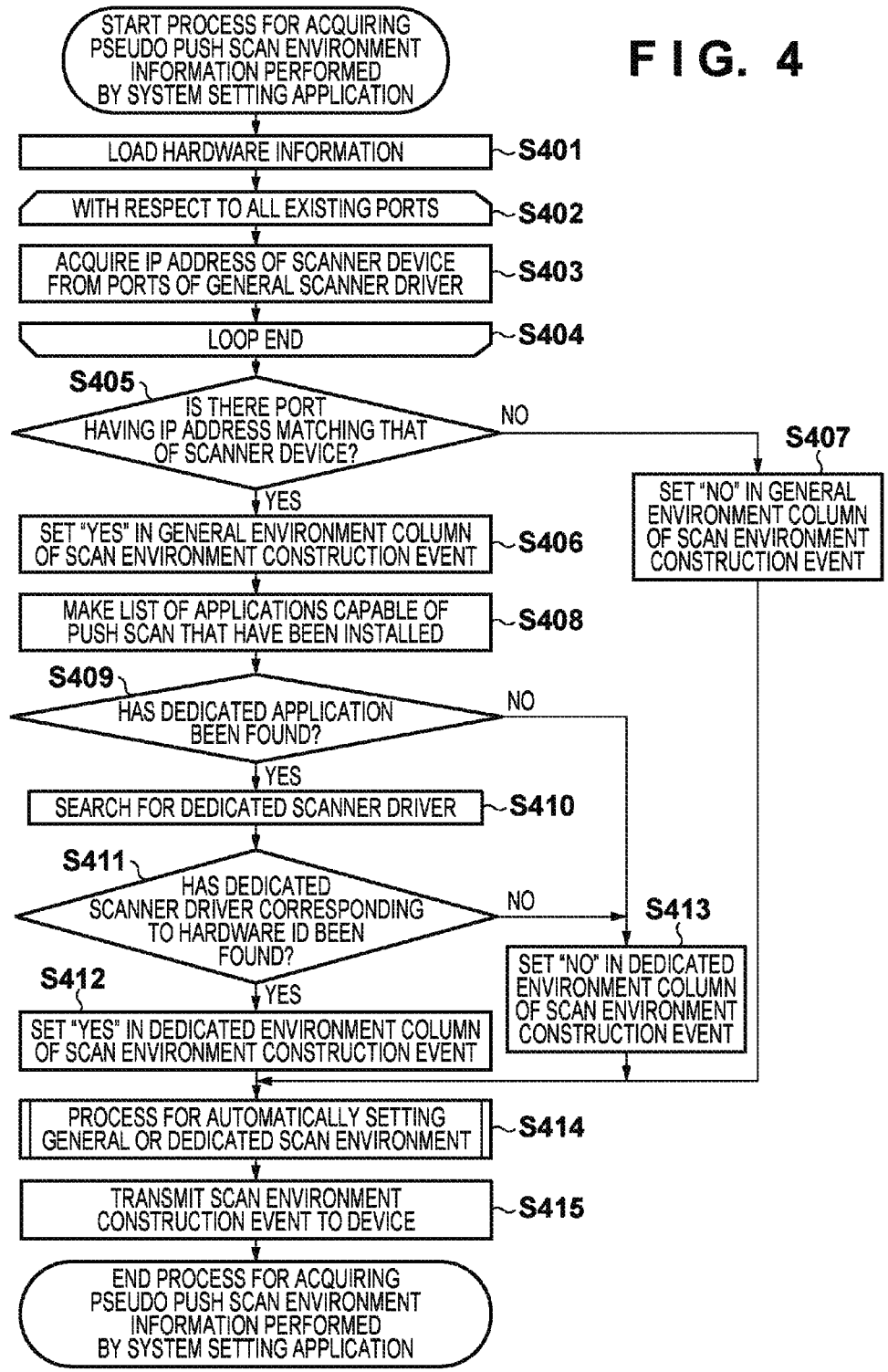
FIG. 4 is a flowchart illustrating an example of a process for acquiring pseudo push scan environment information performed by the information processing apparatus according to the embodiment of the present invention.
Figure 5:
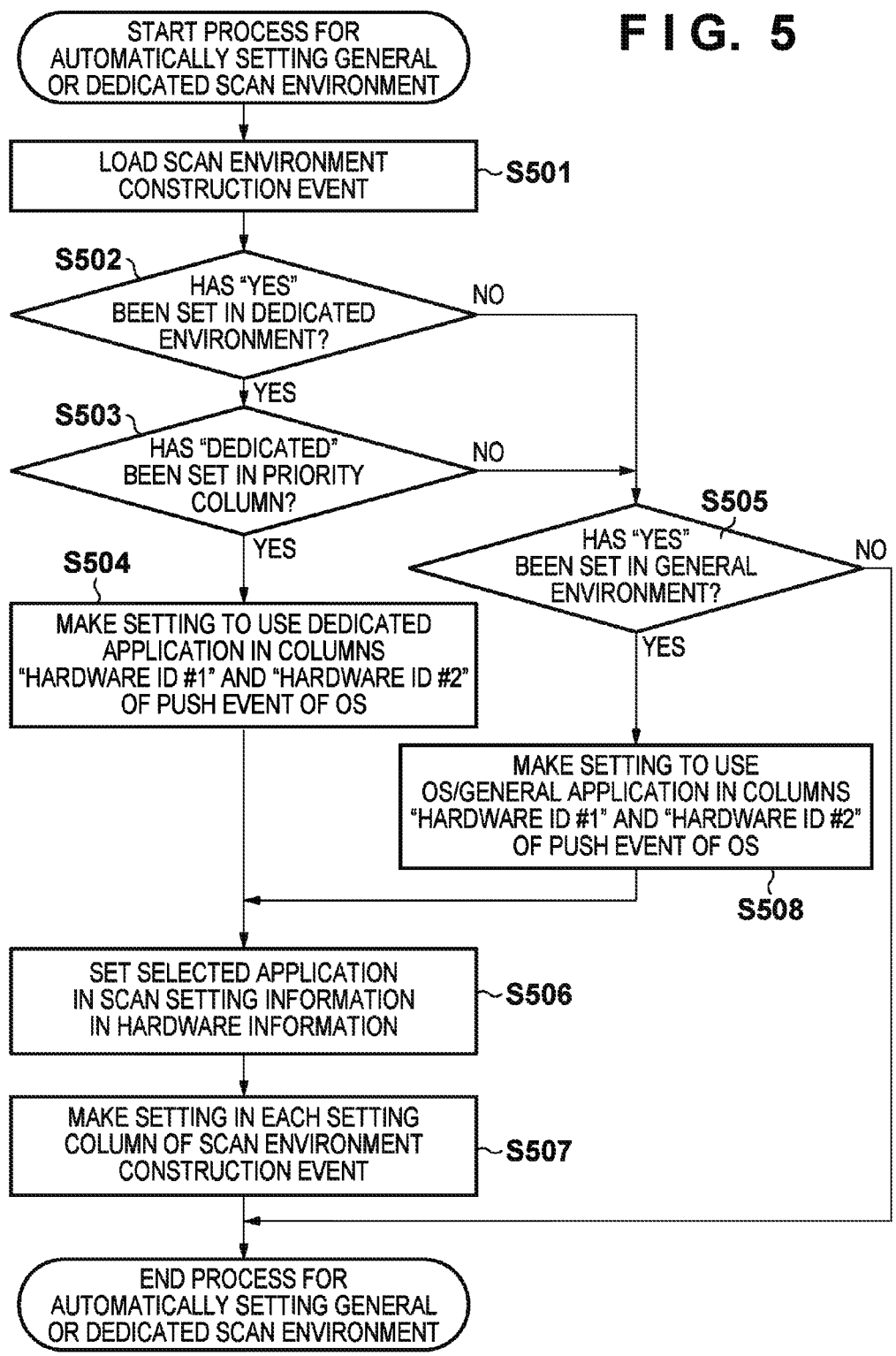
FIG. 5 is a flowchart illustrating an example of a process for automatically setting a general or dedicated scan environment performed by a system setting application of the information processing apparatus according to the embodiment of the present invention.

Next, in S503, the system setting application 125 refers to the priority column of the hardware information loaded into the RAM 112 in S401 of FIG. 4, and determines whether or not "dedicated" has been set. If "dedicated" has been set, the processing advances to S504. If "dedicated" has not been set, the processing advances to S505. In S504, in order to preferentially use the dedicated scan environment, the system setting application 125 makes a setting so as to use the dedicated application 130 in the columns "Hardware ID #1" and "Hardware ID #2" of the hardware information in the push event settings of the OS 122.

If, on the other hand, it is determined in S502 that there is no environment in which the dedicated scanner driver 126 has been installed, or it is determined in S503 that "dedicated" has not been set in the priority column of the hardware information, the processing advances to S505. In S505, the system setting application 125 refers to the general environment column of the scan environment construction event, and determines whether or not there is an environment in which the OS/general application 128 and the OS/general scanner driver 127 have been installed. If it is determined that there is a general environment, the processing advances to S508. If it is determined that there is no general environment, the processing ends.

In S508, in order to preferentially use the general scan environment, the system setting application 125 makes a setting so as to use the OS/general application 128 in the columns "Hardware ID #1" and "Hardware ID #2" of the hardware information in the push event settings of the OS 122. After the processing of S504 and S508, the processing advances to S506, where the system setting application 125 sets the selected application in the scan setting information in the hardware information.

Next, in S507, the system setting application 125 makes a setting in each setting column of the scan environment construction event currently being created to complete the scan environment construction event, and the processing ends. If it is determined in S505 that there is no general environment, which is a special case in the present embodiment, it is determined that the environment within the information processing apparatus 101 has an anomaly, and the processing ends. Eventually, in S304 of FIG. 3, an error message indicating that there is no pseudo push scan environment is shown to the user. In this case, in S309, the error message is displayed on the operation unit 137 of the scanner device 102.

User Interface

Figure 6:
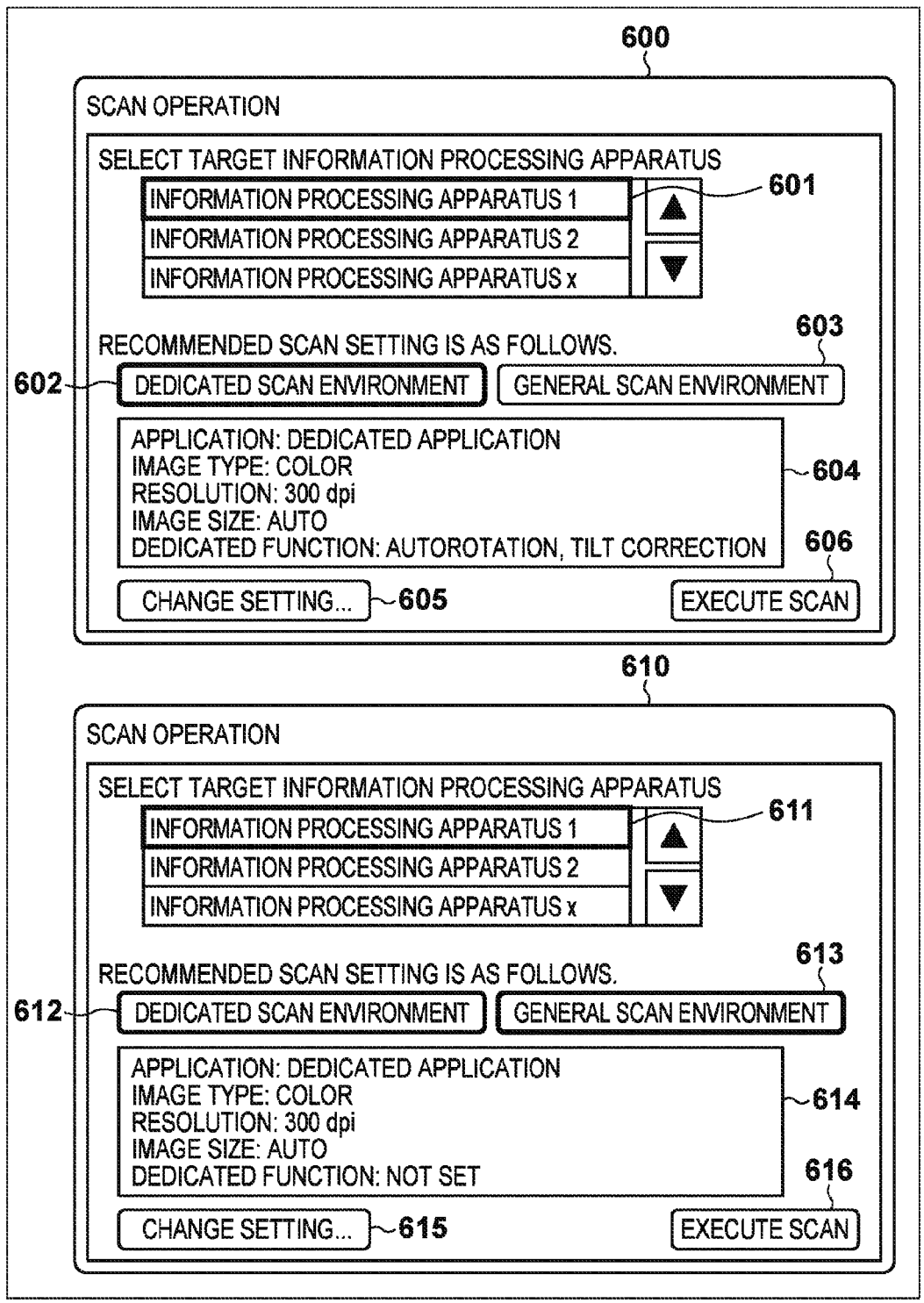
FIG. 6 is a diagram showing examples of user interfaces of the scanner device according to the embodiment of the present invention.

Examples of user interfaces (hereinafter also referred to as screens) of the operation unit 137 of the scanner device 102 will be described next with reference to FIGS. 6 and 7. When the user selects a scan menu with the operation unit 137, the scanner device 102 displays a scan operation screen 600 as shown in FIG. 6. In the scan operation screen 600, information processing apparatuses to which scan data can be transmitted are displayed in a scan data destination list 601 so as to be capable of being selected. When the user presses a scan execution button 606, the scanner device 102 executes a pseudo push scan operation on the information processing apparatus 101 selected from the scan data destination list 601.

In the scan operation screen 600, as settings specific to the present embodiment, a dedicated scan environment button 602 and a general scan environment button 603 are displayed on the operation unit 137. The dedicated scan environment button 602 and the general scan environment button 603 are buttons for informing the user of the status information and selection status of a scan environment that can be used in the information processing apparatus selected from the scan data destination list 601. The dedicated scan environment button 602 and the general scan environment button 603 each have three display modes indicating the display status, and the processing performed when the button is pressed by the user varies depending on the status. For example, if the information processing apparatus 101 has both a dedicated scan environment and a general scan environment, both the dedicated scan environment button 602 and the general scan environment button 603 are displayed so as to be capable of being selected.

The three display modes include a valid and selected mode, a validity mode and an invalidity mode. The scanner device 102 provides, on the scan operation screen 600, a display in which one of the display modes has been reflected based on the content of the scan environment construction event obtained by making a query to the information processing apparatus 101 to which scan data is to be transmitted, which was set in S301 of FIG. 3. The three modes will be described below.

In the valid and selected mode, a button for the currently selected environment that can be pressed by the user is displayed in color or with a pattern to distinguish it. Through the query processing of the scanner device 102, a button for the preferentially-used scan environment will be in the valid and selected mode. In this display mode, the user can press the button, but the scan environment has already been selected, and therefore the scanner device 102 does not need to execute the processing by the button being pressed. The validity mode refers to a mode displayed when, in the scan environment construction event, the value indicating "yes" has been set in the corresponding environment column (the dedicated environment or the general environment). In this display mode, the user can press the button. When the button is pressed, the scanner device 102 advances the processing from the step S307 of FIG. 3 to step S308, and then to S310. In S310, the scanner device 102 displays a screen 800, as shown in FIG. 7, indicating that the set scan environment has been changed on the operation unit 137. Through the operations described above, the user can change the scan environment, and the display of the scan operation screen 600 is updated so that the user can check the content of the changes. The invalidity mode is a mode displayed when, in the scan environment construction event, the value indicating "no" has been set in the corresponding environment column (the dedicated environment or the general environment). In this display mode, the button is displayed in gray and the user cannot press and select the button.

Reference numeral 604 indicates a list box that displays the details of the currently set scan settings. In the list box 604, based on the content of the scan environment construction event, the scanner device 102 displays, on the operation unit 137, the corresponding common scan setting information and the values of the dedicated scan setting only when the user has selected the dedicated scan environment. In the scan operation screen 600 shown in FIG. 6, the dedicated scan environment button 602 is in the selected mode, and thus "Dedicated function: Autorotation, Tilt correction" is displayed in the list box 604. Furthermore, the details of the scan settings that can be set with the dedicated scanner driver 126 or the dedicated application 130 are displayed. When a setting change button 605 is pressed by the user, a target information processing apparatus environment setting screen 700, shown in FIG. 7, is displayed on the operation unit 137.

A scan operation screen 610 shown in FIG. 6 is an example of a screen displayed when a change has been made to the content displayed in the scan operation screen 600 by the user. In the scan operation screen 600, the dedicated scan environment has been set as the recommended scan setting, but when the user presses the general scan environment button 603, the screen 800 indicating that the set scan environment has been changed shown in FIG. 7 is displayed, and thereafter the scan operation screen 610 is displayed, which is an example of the updated screen. In this case, the recommended scan setting has been changed to the general scan environment, and thus "Dedicated function: Not set" is displayed in a list box 614 and the content of the scan settings that can be set with the dedicated scanner driver 126 or the dedicated application 130 becomes invalid.

Figure 7:
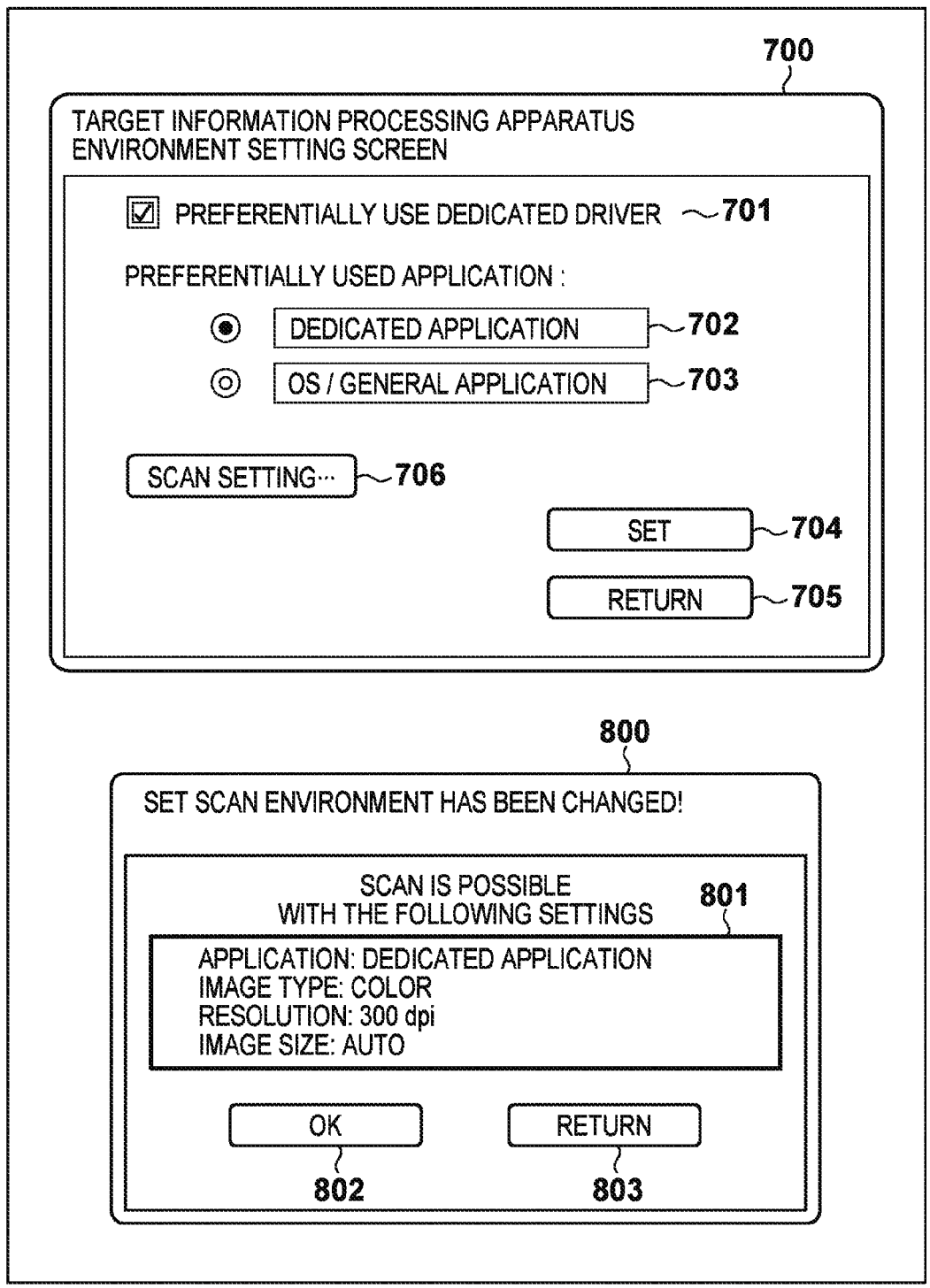
FIG. 7 is a diagram showing examples of user interfaces of the scanner device according to the embodiment of the present invention.

In the target information processing apparatus environment setting screen 700 shown in FIG. 7, the user can select a pseudo push scan operating method he/she wants to run on the scan data destination information processing apparatus 101 to which scan data is to be transmitted. In the screen 700, a checkbox 701 for selecting whether or not to preferentially use the dedicated scanner driver, and radio buttons 702 and 703 for selecting a scan application that should be preferentially used are displayed. When the user presses a set button 704, the display returns to the screen 610 shown in FIG. 6, and the settings made in the screen 700 are reflected in the new scan data destination information processing apparatus 101. When a return button 705 is pressed, the display returns to the screen 600 without storing the changes. When the user presses a scan setting button 706, although not shown, a screen for making desired scan settings including dedicated scan settings is displayed.

FIG. 7 shows the screen 800 indicating that the set scan environment has been changed, which is displayed when the user presses either the button 602 or the button 603 that is in the validity mode in the screen 600 shown in FIG. 6. The screen 800 is an example of a screen displayed on the operation unit 137 when, in the pseudo push scan operation shown in FIG. 3 that is commenced by the scanner device 102, the processing reaches step S310.

In 801, main scan environment settings are displayed including the name of application used, the image type, the resolution and the image size. When the user presses an OK button 802, the scanner device 102 creates hardware information 144 in which the content of the changes has been reflected, and again performs processing from S302. As a result, the updated scan operation screen 610 is displayed on the operation unit 137. When the user presses a scan execution button 616 in the screen 610 after checking the scan settings, the scanner device 102 commences a pseudo push scan operation. S313 shown in FIG. 3 is executed within the scanner device. When the user presses a return button 803 in the screen 800, the display returns to the screen 600 shown in FIG. 6, or in other words, to the state of the operation unit 137 before the user pressed the button 602 or 603.

Screen Transition

Figure 8:
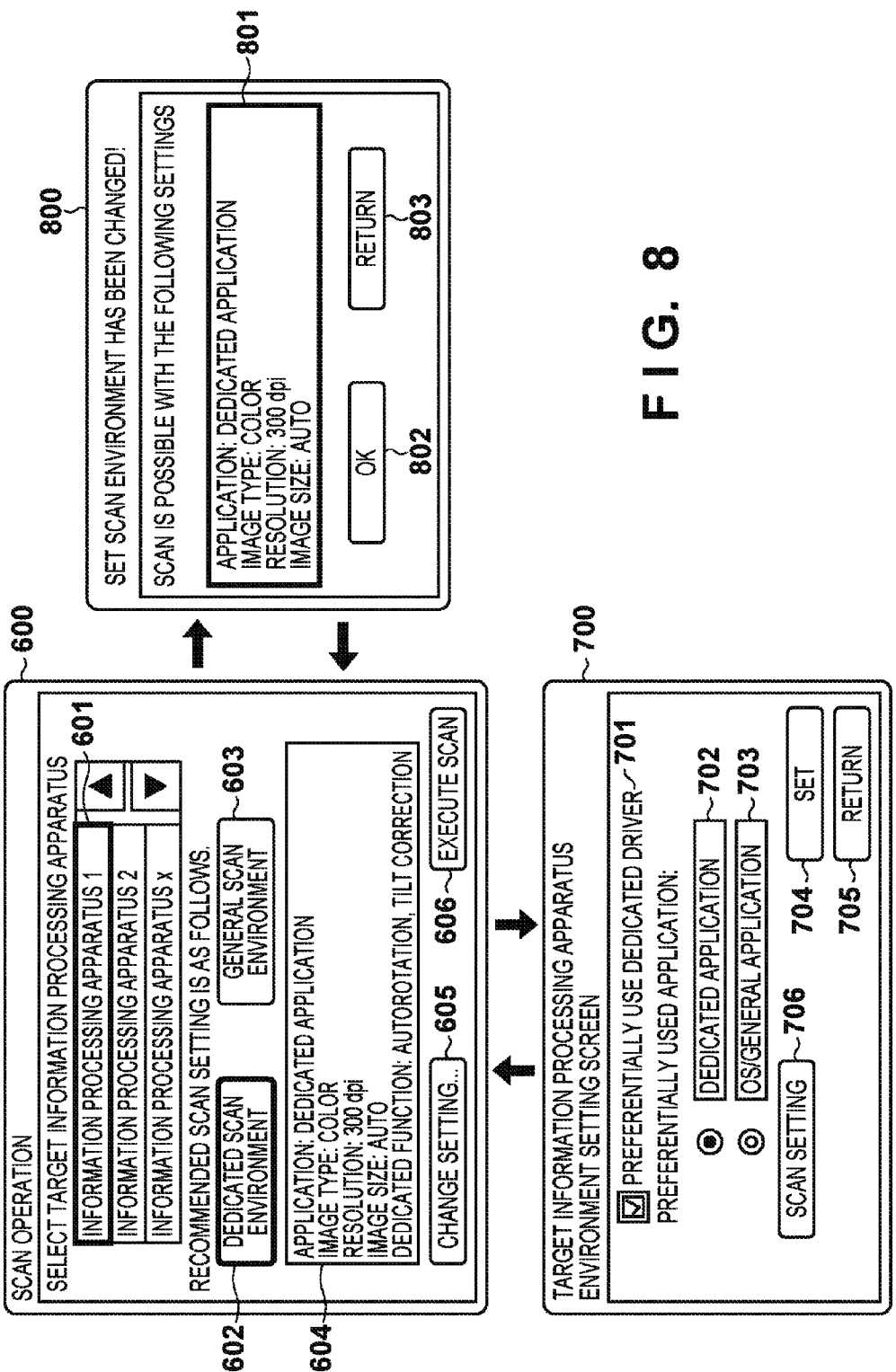
FIG. 8 is a transition diagram of user interfaces according to the embodiment of the present invention.

Transition of the screen on the display unit of the operation unit 137 of the scanner device 102 will be described next with reference to FIG. 8. First, the operation unit 137 displays the scan operation screen 600. In response to the setting change button 605 being pressed, the operation unit 137 displays the screen 700. When the set button 704 is pressed, the settings are reflected. When the return button 705 is pressed, the settings are not reflected. In either case, the display returns to the scan operation screen 600. In the scan operation screen 600, when the user presses the button 602 or 603 that is in the validity mode, the screen 800 indicating that the set scan environment has been changed is displayed.

In the screen 800 indicating that the set scan environment has been changed, when the OK button 802 is pressed, processing of setting the scan environment and scan settings in the scan data destination information processing apparatus 101 is again executed, and as a result the scan operation screen 610 is displayed together with the result of the processing. Also, in the screen 800 indicating that the set scan environment has been changed, when the return button 803 is pressed, the settings are not reflected, and the display returns to the scan operation screen 600.

Scan Operation Sequence

A scan operation sequence performed by the apparatuses will be described next with reference to FIG. 9. Here, how scan system environment construction processing is performed between related programs during a series of scan operations will be described in detail, assuming that the system setting application has already been installed in the scan data destination information processing apparatus 101 and is activated in the RAM 112.

First, in S1000, the user inputs a selection of a scan data destination information processing apparatus into the operation unit 137 of the scanner device 102 via the screen 600. Upon receiving the user operation, in S1001, the scanner device 102 transmits a push mode event according to WS-Eventing that has referenced the hardware information 144 as parameters to the scan data destination information processing apparatus 101.

Next, in S1002, the system setting application 125 activated in the RAM 112 of the scan data destination information processing apparatus 101 makes a query to the OS 122, and acquires the IP address of the scanner device from the ports of the general scanner driver that has been set. In S1003, the system setting application 125 creates new scan environment construction event information in the RAM 112, and writes the result acquired in S1002 thereinto. Next, in S1004, the system setting application 125 makes a list of applications capable of push scan that have been installed. In S1005, the system setting application 125 searches the list for the dedicated application. After that, in S1006, if the dedicated application has been found, the system setting application 125 activates the dedicated application 130. If the dedicated application has not been found, the system setting application 125 activates the OS/general application 128.

Next, in S1007, in order to find whether or not the dedicated scanner driver 126 is present, the system setting application 125 performs search processing spanning from S410 to S420 in FIG. 4. Through this processing, scan environment information is prepared. In S1008, the system setting application 125 automatically determines an optimal scan environment. Then, in S1009, the system setting application 125 activates the scanner driver 126 or 127 based on the determination. Next, in S1010, the system setting application 125 causes the application 128 or 130 to perform push event and scan setting according to the hardware information 129 via the OS 122 if necessary. A pseudo push scan environment is thereby constructed. In S1011, the system setting application 125 completes the information of the constructed environment as a scan environment construction event. In S1012, the system setting application 125 transmits the complete scan environment construction event to the scanner device 102, and the processing ends.

Next, in S1013, upon receiving the scan environment construction event, the scanner device 102 displays the screen 610 on the operation unit 137. When the screen 610 is displayed, in S1014, the user sets an original while viewing the display, and presses the scan execution button 616. Upon receiving the press operation of the scan execution button 616, in S1015, the scanner device 102 transmits a push scan event to the scan data destination information processing apparatus 101.

In S1016, the information processing apparatus 101 receives the transmitted push scan event, and if necessary, transmits the push scan event to the application 128 or 130 via the OS 122. Upon receiving the push scan event, in S1017, the application is activated to commence a scan operation. In S1018, the scanner driver 126 or 127 is activated. Then, in S1019, the scanner driver 126 or 127 commences the scan operation in response to an instruction from the application 128 or 130. In S1020, the scanner driver transmits a scan command to the scanner device 102.

The scanner device 102 commences the scan operation in S1021, and transfers read image data to the scanner driver 126 or 127 in S1022. The scanner driver 126 or 127 performs image processing to convert the received image data to a data format instructed by the application 128 or 130 in S1023, and transfers the image data to the application 128 or 130 in S1024.

In S1025, the application 128 or 130 temporarily stores the received image in the external memory 121 or loads the received image into the RAM 112, and waits for the user to arrive at the scan data destination information processing apparatus. After that, in S1026, the application 128 or 130 transmits a message indicating that the scan process has finished to the scanner driver 126 or 127. In S1027, the scanner driver 126 or 127 transmits a message indicating that the scan process has finished to the scanner device 102. Upon receiving the message, in S1028, the scanner device 102 displays a message indicating that the scan process has finished on the operation unit 137.

Hardware Information

An example of hardware information according to the present embodiment will be described next with reference to FIG. 10. The hardware information is a collection of information necessary for the system setting application 125 to construct a pseudo push scan environment in the information processing apparatus 101. The hardware information is generated by dynamically adding information obtained as a result of operation of the operation unit 137 by the user to the data of hardware information 144 statically stored in the external memory 143 or the like of the scanner device 102. The generated hardware information 144 is referenced by an event transmitted to the scan data destination information processing apparatus 101, and transmitted by the scanner device 102 to the information processing apparatus 101.

Hardware IDs #1 and #2 and a MAC address shown in FIG. 10 are values assigned specifically to the scanner device 102 and statically stored in the ROM 134. IP address is a value set in the environment of the LAN 104 to which the scanner device 102 is connected, and is initially stored in the external memory 143. Protocol #1 and Protocol #2 are the names of scanner protocols used by the scanner device 102 to perform operations. If a plurality of protocols are supported, Protocol #1 is defined to be preferentially used.

The protocols are used by the system setting application 125 running in the RAM 112 of the scan data destination information processing apparatus 101. The order in which the protocols are preferentially used can be changed by a user operation. For example, the selection of the checkbox 701 for selecting whether or not to preferentially use the dedicated scanner driver shown in FIG. 7 is reflected, and the value of the priority order column is changed to a value indicating "dedicated" by the scanner device 102. When the checkbox 701 is checked, the scanner device 102 changes, for example, the value of Protocol #1 in the hardware information 144 to the name of a scanner protocol used by the dedicated driver such as Vendor Network Protocol.

Priority designates a scan environment that is preferentially used in pseudo push scan. The priority can be changed by, for example, a user operation, and the selection of the radio button 702 or 703 for selecting a scan application that should be preferentially used shown in FIG. 7 is reflected. Scan setting information stores settings requested by the user in the form of a list. In the scan setting information, for example, the results of scan settings displayed by the scan setting button 706 of FIG. 7 being pressed are reflected.

Scan Environment Construction Event

An example of a scan environment construction event according to the present embodiment will be described next with reference to FIG. 11. The scan environment construction event of the present embodiment can be, for example, a message written in XML-SOAP. The information pieces obtained as a result of construction of a pseudo push scan environment in the information processing apparatus 101 by the system setting application 125 are reflected in the values shown in FIG. 11, and dynamically stored in the RAM 112 or the like of the information processing apparatus 101. These information pieces are set in a SOAP message portion of the scan environment construction event that is transmitted from the system setting application 125 to the scanner device 102.

Installation results are set by the system setting application 125. The results of selection and installation of a scanner driver are reflected in Scanner driver name, Driver version and Scanner driver date. In Registered application, the results of setting an application and a push event are reflected. The results of scan setting are reflected as scan setting results.

When the scanner device 102 receives a scan environment construction event, the content of results of setting the pseudo push scan environment is displayed on the display unit of the operation unit 137. For example, the main environment settings of the screen 600 displayed when the environment setting has finished in the scan data destination information processing apparatus such as the values displayed in 604 including the name of application used, the image type, the resolution and the image size are referenced from the scan environment construction event information.

Other Embodiments

The present invention is not limited to the above embodiment, and various modifications can be made. For example, a variation of the pseudo push scan process by the scanner device of the above embodiment shown in FIG. 3 will be described from step S310. In the above embodiment, in S310, the scanner device 102 waits for the scan execution button 616 to be pressed by the user. When the scan execution button 616 is pressed, in S302, a push scan event is transmitted to the information processing apparatus 101. As described above, in the above embodiment, there are two types of push scan events that are transmitted by the scanner device 102. However, the system setting application 125 may set the two types of push events in the OS 122 such that the same pseudo push event processing can be commenced. In this case, a setting is made such that the same processing can be commenced regardless of which of the push scan event for the dedicated application and that for the general application is sent to the information processing apparatus 101 by the scanner device 102. Accordingly, if the value of the priority column of the scan environment construction event indicates "dedicated", the information processing apparatus 101 commences a push scan process for the dedicated application. If the value of the priority column of the scan environment construction event indicates "general", the information processing apparatus 101 commences a push scan process for the general application.

Also, the above embodiment uses protocols defined by WS-Eventing to transmit notifications, such as an event, between the information processing apparatus 101 and the scanner device 102. However, the present invention is not limited thereto, and for example, GENA (General Event Notification Architecture) or the like may be used. Also, the system setting application 125 running on the information processing apparatus 101 may be provided with a unit that appropriately conveys hardware information, and any protocol can be used as long as similar results can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183389, filed Aug. 18, 2010, which is hereby incorporated by reference herein in its entirety.

The invention claimed is:

1. An image reading system in which a plurality of information processing apparatuses and an image reading apparatus capable of executing a specific scan mode are connected, the image reading apparatus comprising:
 a selection unit that selects an information processing apparatus to which image data read from an original is to be transmitted;
 a transmission unit that transmits identification information for identifying the image reading apparatus stored in advance in a memory and an instruction to construct an environment for performing the specific scan mode to the information processing apparatus selected by the selection unit;
 a receiving unit that receives a response to the instruction transmitted by the transmission unit; and
 a display control unit that, when the response is received by the receiving unit, displays a setting screen in which settings regarding the environment for performing the specific scan mode can be changed on a display, and
 each information processing apparatus comprising:
 a construction unit that, when the identification information and the instruction to construct the environment for performing the specific scan mode are received, constructs a scan environment dedicated to the image reading apparatus or a general scan environment usable in a plurality of image reading apparatuses as the environment for performing the specific scan mode used in the image reading apparatus; and
 a notification unit that notifies the image reading apparatus of a result of construction of the environment by the construction unit.

2. The image reading system according to claim 1, wherein, when a change is made to current settings via the setting screen displayed by the display control unit, the transmission unit further updates the identification information according to the content of the change and transmits the updated identification information and the instruction to construct the environment for performing the specific scan mode to the information processing apparatus.

3. The image reading system according to claim 1, wherein the identification information includes information indicating a priority order according to which the dedicated scan environment and the general scan environment are to be used, and
 the construction unit comprises a search unit that searches for the environment for performing the specific scan mode of the information processing apparatus, and constructs the environment for performing the specific scan mode according to a result of search by the search unit and the priority order.

4. The image reading system according to claim 1, wherein, when the information processing apparatus has both the dedicated scan environment and the general scan environment, the dedicated scan environment and the general scan environment are displayed on the setting screen so as to be capable of being selected.

5. The image reading system according to claim 4, wherein one of the dedicated scan environment and the general scan environment that is currently selected as the environment for performing the specific scan mode is displayed on the setting screen in a distinguishable manner.

6. An image reading apparatus capable of connecting to a plurality of information processing apparatuses and executing a specific scan mode, the image reading apparatus comprising:
 a selection unit that selects an information processing apparatus to which image data read from an original is to be transmitted;
 a transmission unit that transmits identification information for identifying the image reading apparatus stored in advance in a memory and an instruction to construct an environment for performing the specific scan mode to the information processing apparatus selected by the selection unit;
 a receiving unit that receives a response to the instruction transmitted by the transmission unit; and
 a display control unit that, when the response is received by the receiving unit, displays a setting screen in which settings regarding the environment for performing the specific scan mode can be changed on a display.

7. An image reading apparatus comprising:
 a selection unit that selects an information processing apparatus to which image data read from an original is to be transmitted;
 an acquisition unit that acquires, from the information processing apparatus, setting information regarding a read processing stored in the information processing apparatus selected by the selection unit;
 a modifying unit that modifies the setting information acquired by the acquisition unit in accordance with an instruction of an user;
 a transmission unit that transmits the setting information modified by the modifying unit to the information processing apparatus;
 an instruction transmission unit that transmits a transmission instruction of a read start request to the information processing apparatus upon receiving a reading start instruction from the user; and
 a control unit that executes the read processing of an original based on the modified setting information, and transmits generated image data to the information processing apparatus upon receiving a read start request transmitted from the information processing apparatus in response to the transmission instruction by the instruction transmission unit.

8. A method for controlling an image reading system in which a plurality of information processing apparatuses and an image reading apparatus capable of executing a specific scan mode are connected, the method comprising:
 with the image reading apparatus,
 selecting an information processing apparatus to which image data read from an original is to be transmitted;
 transmitting identification information for identifying the image reading apparatus stored in advance in a memory and an instruction to construct an environment for performing the specific scan mode to the selected information processing apparatus;
 receiving a response to the transmitted instruction; and
 when the response is received in the receiving step, displaying a setting screen in which settings regarding the environment for performing the specific scan mode can be changed on a display, and
 with each information processing apparatus, when the identification information and the instruction to construct the environment for performing the specific scan mode are received, constructing a scan environment dedicated to the image reading apparatus or a general scan environment usable in a plurality of image reading apparatuses as the environment for performing the specific scan mode used in the image reading apparatus; and
notifying the image reading apparatus of a result of construction of the environment in the construction step.

9. A non-transitory computer-readable storage medium storing, in executable form, a computer program for causing a computer to execute the method for controlling an image reading system according to claim 8.

10. A method for controlling an image reading apparatus capable of connecting to a plurality of information processing apparatuses and executing a specific scan mode, the method comprising:
    selecting an information processing apparatus to which image data read from an original is to be transmitted;
    transmitting identification information for identifying the image reading apparatus stored in advance in a memory and an instruction to construct an environment for performing the specific scan mode to the selected information processing apparatus;
    receiving a response to the transmitted instruction; and
    when the response is received in the receiving step, displaying a setting screen in which settings regarding the environment for performing the specific scan mode can be changed on a display.

11. A non-transitory computer-readable storage medium storing, in executable form, a computer program for causing a computer to execute the method for controlling an image reading apparatus according to claim 10.

12. A method for controlling an image reading apparatus, the method comprising:
    selecting an information processing apparatus to which image data read from an original is to be transmitted;
    acquiring, from the information processing apparatus, setting information regarding a read processing stored in the information processing apparatus selected in the selecting step;
    modifying the setting information acquired in the acquiring step in accordance with an instruction of an user;
    transmitting the setting information modified in the modifying step to the information processing apparatus;
    transmitting a transmission instruction of a read start request to the information processing apparatus upon receiving a reading start instruction from the user; and
    executing the read processing of an original based on the modified setting information, and transmitting generated image data to the information processing apparatus upon receiving a read start request transmitted from the information processing apparatus in response to the transmission instruction in the transmitting step.

13. A non-transitory computer-readable storage medium storing, in executable form, for causing a computer to execute the method for controlling an image reading apparatus according to claim 12.

* * * * *